(12) United States Patent
Moharana et al.

(10) Patent No.: US 12,482,290 B2
(45) Date of Patent: Nov. 25, 2025

(54) METHOD AND ELECTRONIC DEVICE FOR MANAGING PRIVATE CONTENT

(71) Applicant: SAMSUNG ELECTRONICS CO., LTD., Suwon-si (KR)

(72) Inventors: Sukumar Moharana, Karnataka (IN); Manoj Goyal, Karnataka (IN); Debi Prasanna Mohanty, Karnataka (IN); Herojit Sharma Laipubam, Karnataka (IN); Gopi Ramena, Karnataka (IN); Siva Prasad Thota, Karnataka (IN); Vanraj Vala, Karnataka (IN); Chinmay Anand, Bengaluru Karnataka (IN); Archit Panwar, Bengaluru Karnataka (IN); Vipin Rao, Bengaluru Karnataka (IN); Naresh Purre, Bengaluru Karnataka (IN); Ravi Chandra Nalam, Bengaluru Karnataka (IN); Sreevatsa Dwaraka Bhamidipati, Bengaluru Karnataka (IN); Kachana Raghunatha Reddy, Bengaluru Karnataka (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 870 days.

(21) Appl. No.: 17/740,531

(22) Filed: May 10, 2022

(65) Prior Publication Data
US 2022/0277091 A1    Sep. 1, 2022

Related U.S. Application Data

(63) Continuation of application No. PCT/KR2021/009753, filed on Jul. 28, 2021.

(30) Foreign Application Priority Data

Jul. 31, 2020   (IN) .............................. 202041032969
Jul. 14, 2021   (IN) .............................. 202041032969

(51) Int. Cl.
G06F 21/62       (2013.01)
G06F 21/31       (2013.01)
G06V 40/00       (2022.01)

(52) U.S. Cl.
CPC .............. G06V 40/00 (2022.01); G06F 21/31 (2013.01)

(58) Field of Classification Search
CPC .......... G06F 16/54; G06F 16/55; G06F 21/31; G06F 21/6245; G06N 3/045; G06V 10/82;

(Continued)

(56) References Cited

U.S. PATENT DOCUMENTS 7,006,689 B2   2/2006   Kasutani
7,043,474 B2   5/2006   Mojsilovic et al.

(Continued)

FOREIGN PATENT DOCUMENTS

KR   10-2016-0023164   3/2016

OTHER PUBLICATIONS

International Search Report for PCT/KR2021/009753, mailed Nov. 11, 2021, 3 pages.

(Continued)

*Primary Examiner* — Michael J Vanchy, Jr.
(74) *Attorney, Agent, or Firm* — Nixon & Vanderhye P.C.

(57) ABSTRACT

Embodiments herein provide a method for managing private content by an electronic device (100). The method includes: displaying content on a screen of the electronic device (100), wherein the content is stored in a non-secure folder of the electronic device (100) and extracting a feature(s) of the displayed content to categorize the displayed content using a machine learning (ML) model. Further, the method includes categorizing the displayed content into the private content or public content based on globally objectionable (Continued)

private content and user-specific objectionable private content. Further, the method includes displaying a recommendation on the screen of the electronic device (100) for transferring the displayed content into a secure folder of the electronic device (100), detecting an event to transfer the private content into the secure folder of the electronic device (100), and automatically transferring the private content from the non-secure folder to the secure folder of the electronic device (100).

10 Claims, 14 Drawing Sheets

(58) Field of Classification Search
CPC ........ G06V 20/35; G06V 20/60; G06V 40/00; G06V 40/10; G06V 40/20
See application file for complete search history.

(56) References Cited

U.S. PATENT DOCUMENTS

| | | |
|---|---|---|
| 10,089,332 B2 | 10/2018 | Lee et al. |
| 2002/0059221 A1* | 5/2002 | Whitehead .......... G06F 16/9535 707/999.005 |
| 2008/0159627 A1* | 7/2008 | Sengamedu ........ G06F 16/5838 707/E17.023 |
| 2009/0025090 A1* | 1/2009 | Clement .................. G07C 9/27 726/28 |
| 2011/0135204 A1 | 6/2011 | Choi |
| 2011/0161999 A1 | 6/2011 | Klappert et al. |
| 2017/0068813 A1 | 3/2017 | Fram |

OTHER PUBLICATIONS

Written Opinion of the ISA for PCT/KR2021/009753, mailed Nov. 11, 2021, 5 pages.

* cited by examiner

METHOD AND ELECTRONIC DEVICE FOR MANAGING PRIVATE CONTENT

CROSS-REFERENCE TO RELATED APPLICATIONS

This application is a continuation of International Application No. PCT/KR2021/009753, designating the United States, filed on Jul. 28, 2021, in the Korean Intellectual Property Receiving Office and claiming priority to Indian Provisional Patent Application No. 202041032969, filed on Jul. 31, 2020, in the Indian Patent Office and to Indian Complete Patent Application No. 202041032969, filed on Jul. 14, 2021, in the Indian Patent Office, the disclosures of all of which are incorporated by reference herein in their entireties.

BACKGROUND

Field

The disclosure relates to an electronic device, and for example to a method and an electronic device for managing private content.

Description of Related Art

In general, smartphones are designed largely to increase user's ability to communicate with another user. Smartphones have completely changed ways for users to communicate, with texting, calls, video chats, and applications that allow individuals to quickly connect with other user across a globe, as illustrated in FIGS. 1A and 1B. Although the smartphones have offered several benefits, like an ability to connect via social media (1), the smartphones have also resulted in numerous drawbacks for the users such as poor social interaction, distraction, uncensored content, addiction, and loss of privacy. Furthermore, the users receive a large amount of content on their smartphones every day. While viewing content on their smartphones on a regular basis, some users consider some content to be sensitive or private content, while others believe it to be universal (known as public content). These contents include photos, videos, messages, and notifications, etc. If the content is sensitive, sensitive content may bring embarrassment to the user if the sensitive content is accidentally shared with other users, uploaded to a cloud, or posted on social media (1). Because of the aforementioned reasons, the users are always concerned about whether or not any content on their smartphone is sensitive, and whether or not the users should be manually filtered out the sensitive content and the public content.

Consider an example scenario in which a user of an electronic device (10) wants to share photos with friends via a social media application (e.g. W-share group). For that (2), the user of the electronic device (10) must manually select photos from the electronic device's (10) gallery application and post them on the social media application. The user of the electronic device (10) was required to post group photos but inadvertently shared a private photo with the group photos in the social media application (3) and sharing of the private photo in the social media application may cause embarrassment (4) to the user of the electronic device (10).

Some of the existing methods/electronic device(s) provide a solution to avoid embarrassment using a secure folder mechanism. The secure folder mechanism is a second space within a storage of the electronic device (10) with an additional encrypted layer. The storage is a place where the user of the electronic device (10) can keep photos, videos, files, and applications/other data private. The storage is separated from a primary storage of the electronic device (10).

Consider an example scenario in which the user of the electronic device (10) manually selects photos (5) from the electronic device's (10) gallery application and moves them (6) to a secure folder of the electronic device (10). Access to the secure folder (6) requires the use of a Personal Identification Number (PIN), password, pattern, or biometric authentication technique such as ultrasonic fingerprint Identity (ID). As a result, only the authorized user (7) can access to private photos in the electronic device (10).

However, with the existing methods/electronic device(s), the user need to manually select the private content (e.g. text, photos, videos, etc.) and move them to the secure folder, which is time-consuming and inconvenient. Thus, it is desired to provide a useful alternative for protecting user's private content in the electronic device.

SUMMARY

Embodiments of the disclosure provide an electronic device and method of operating the electronic device to automatically transfer private content from a non-secure folder to a secure folder of an electronic device in response to detecting an event on the electronic device, which is time-saving and convenient for a user of the electronic device. The private content is detected by globally objectionable private content and/or user-specific objectionable private content by extracting a feature(s) of displayed content using a Machine Learning (ML) model.

Embodiments of the disclosure may detect the globally objectionable private content by categorizing the displayed content as the private content when a private body part of the human is visible in the displayed content and/or the objectionable element is present in the displayed content, or determining a cumulative confidence score to categorize the displayed content as the private content or a public content when the private body part of the human is not visible in the displayed content and/or the objectionable element is not present in the displayed content. The displayed content may be categorized as the private content if the cumulative confidence score is more than or equal to a pre-defined threshold value and the displayed content is categorized as the public content if the cumulative confidence score is less than to the pre-defined threshold value.

Embodiments of the disclosure may detect the user-specific objectionable private content by determining a user preference for the private content and the public content from a plurality of domains (e.g. image(s), text(s), video(s), etc.) of the electronic device using a multi-modal joint embedding space and correlating the extracted feature(s) with a stored template(s) to categorize the displayed content into the private content or the public content.

Embodiments of the disclosure may switch quickly between the non-secure folder of the electronic device and the secure folder of the electronic device by receiving a gesture from the user of the electronic device. Furthermore, switching from the non-secure folder of the electronic device to the secure folder of the electronic device requires a user authentication, and switching from the secure folder of the electronic device to the non-secure folder of the electronic device does not require the user authentication.

Embodiments of the disclosure may automatically recommend a suitable action(s) (e.g. hiding, encrypting, transferring to the secure folder, masking, etc.) when the displayed content is detected as the private content.

Accordingly, example embodiments may provide a method for managing private content by an electronic device. The method includes: displaying, by the electronic device, content (e.g. a text, an image frame, an audio, a video, etc.) on a screen of the electronic device, where the content is stored in a non-secure folder of the electronic device; extracting, by the electronic device, a feature(s) (e.g. a textual concept, a facial recognition, an action recognition, and Region of Interest (RoI) detection, etc.) of the displayed content to categorize the displayed content using a machine learning (ML) model; detecting, by the electronic device, globally objectionable private content or user-specific objectionable private content; categorizing, by the electronic device, the displayed content into the private content or public content based on the globally objectionable private content or the user-specific objectionable private content; displaying, by the electronic device, a recommendation on the screen of the electronic device for transferring the displayed content into a secure folder of the electronic device in response to categorizing the displayed content as the private content; detecting, by the electronic device, an event to transfer the private content into the secure folder of the electronic device; and automatically transferring, by the electronic device, the private content from the non-secure folder to the secure folder of the electronic device in response to detecting the event.

In an example embodiment, where categorizing, by the electronic device, the displayed content into the private content or the public content based on the globally objectionable private content includes determining, by the electronic device, whether a private body part of a human is visible in the displayed content and/or objectionable element is present in the displayed content; categorizing the displayed content as the private content in response to determining that the private body part of the human is visible in the displayed content and/or the objectionable element is present in the displayed content; determining a cumulative confidence score to categorize the displayed content as the private content or the public content in response to determining that the private body part of the human is not visible in the displayed content and/or the objectionable element is not present in the displayed content.

In an example embodiment, where the displayed content is categorized as the private content based on the cumulative confidence score being more than or equal to a specified threshold value and the displayed content is categorized as the public content based on the cumulative confidence score being less than the specified threshold value.

In an example embodiment, where the private body part of the human includes a belly of the human, buttocks of the human, breasts of the human, and genitalia of the human.

In an example embodiment, where the objectionable element includes a cigarette, a beer bottle, a wine bottle, a champagne bottle, a beer glass, a wine glass, a whiskey glass, a cocktail glass, biometric data of a user, medical information of the user, Personally Identifiable Financial Information (PIFI) of the user and unique identifiers (e.g. passport, voter card, license, medical card, etc.) of the user.

In an example embodiment, where determining the cumulative confidence score to categorize an image frame as the private content or the public content includes: detecting, by the electronic device, that the private body part of the human is not visible in the image frame; determining, by the electronic device, whether multiple human blocks are identified in the image frame; determining a first threshold value (e.g., a minimum confidence score of the sensitive image classifier below which the content is not deemed for consideration under sensitive category) in response to determining that the multiple human blocks are identified in the image frame; determining a second threshold value (e.g., a minimum confidence score of the sensitive image classifier below which the content is not deemed for consideration under sensitive category) in response to determining that the multiple human blocks are not identified in the image frame; and determining, by the electronic device, the cumulative confidence score by adding the first threshold value and the second threshold value.

In an example embodiment, where determining the first threshold value includes: detecting, by the electronic device, a block proximity threshold (e.g., a minimum proximity value between two detected human blocks below which the human blocks are merged into one human block; determining, by the electronic device, whether the multiple human blocks meet the block proximity threshold; grouping the multiple human blocks into a single block and passing the blocks to a sensitive image classifier to calculate the first threshold value in response to determining that the multiple human blocks meet the block proximity threshold; passing individual block to the sensitive image classifier to calculate the first threshold value in response to determining that the multiple human blocks do not meet the block proximity threshold.

In an example embodiment, where categorizing, by the electronic device, the displayed content into the private content or the public content based on the user-specific objectionable private content includes: determining, by the electronic device, a user preference for the private content and the public content from a plurality of domains (e.g. text message, audio, video, image, etc.) of the electronic device using a multi-modal joint embedding space; storing, by the electronic device, the user preference as a template(s) in the electronic device; and correlating, by the electronic device, the extracted feature(s) with the stored template(s) to categorize the displayed content into the private content or the public content.

In an example embodiment, where detecting, by the electronic device, the event to transfer the private content into the secure folder of the electronic device includes: detecting, by the electronic device, that the displayed content as the private content; receiving, by the electronic device, an input on the screen of the electronic device; determining, by the electronic device, whether the user input is authorized; initiating the transformation of the displayed content from the non-secure folder to the secure folder of the electronic device in response to determining that the user input is authorized; and not initiating the transformation of the displayed content from the non-secure folder to the secure folder of the electronic device in response to determining that the user input is not authorized.

In an example embodiment, where the event on the electronic device includes: a gesture of the user of the electronic device to shift the private content into the secure folder of the electronic device, and a gesture of the user of the electronic device to switch quickly between the non-secure folder of the electronic device and the secure folder of the electronic device.

In an example embodiment, where switching from the non-secure folder of the electronic device to the secure folder of the electronic device requires user authentication, and switching from the secure folder of the electronic device to the non-secure folder of the electronic device does not require the user authentication.

In an example embodiment, where automatically recommend a suitable action(s) (e.g. hiding, encrypting, transferring to the secure folder, masking, etc.) when the displayed content is detected as the private content.

Accordingly, various example embodiments herein provide an electronic device for managing the private content. The electronic device includes: a content controller comprising circuitry coupled with a processor and a memory. The content controller is configured to: display the content on the screen of the electronic device, where the content is stored in the non-secure folder of the electronic device; extract the feature(s) of the displayed content to categorize the displayed content using a machine learning (ML) model; detect the globally objectionable private content and the user-specific objectionable private content; categorize the displayed content into the private content or public content based on the globally objectionable private content and/or the user-specific objectionable private content; display the recommendation on the screen of the electronic device for transferring the displayed content into the secure folder of the electronic device in response to categorizing the displayed content as the private content; detect the event to transfer the private content into the secure folder of the electronic device; and automatically transfer the private content from the non-secure folder to the secure folder of the electronic device in response to detecting the event.

These and other aspects of various example embodiments of the disclosure will be better appreciated and understood when considered in conjunction with the following description and the accompanying drawings. It should be understood, however, that the following descriptions, while indicating example embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

This disclosure is illustrated in the accompanying drawings, throughout which like reference letters indicate corresponding parts in the various figures. The above and other aspects, features and advantages of certain embodiments of the present disclosure will be more apparent from the following detailed description, taken in conjunction with the accompanying drawings, in which.

DETAILED DESCRIPTION

Figure 1A:
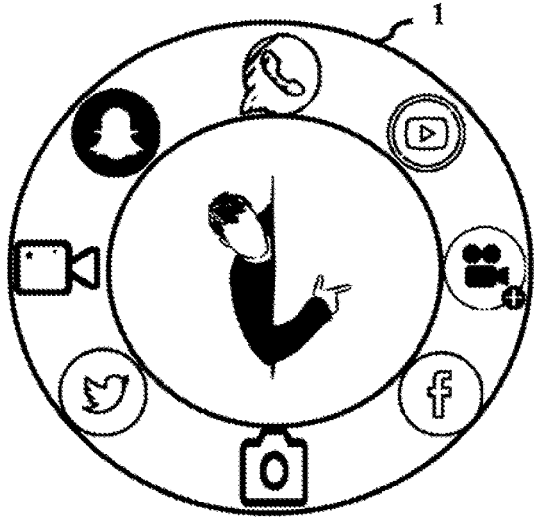
FIGS. 1A and 1B are diagrams illustrating an example scenario in which a user unintentionally shares private content with other users, potentially causing embarrassment to the user, and an existing method to manage private content to avoid the embarrassment, according to conventional art.
Figure 1A:
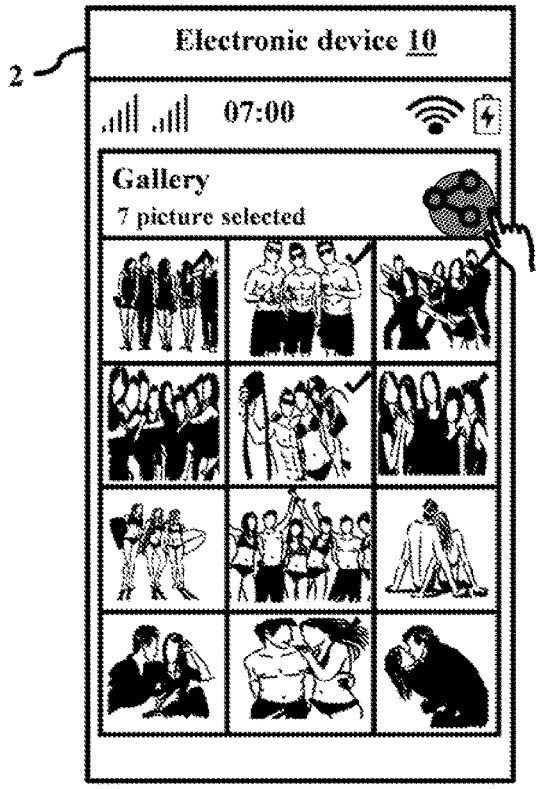
Figure 1A:
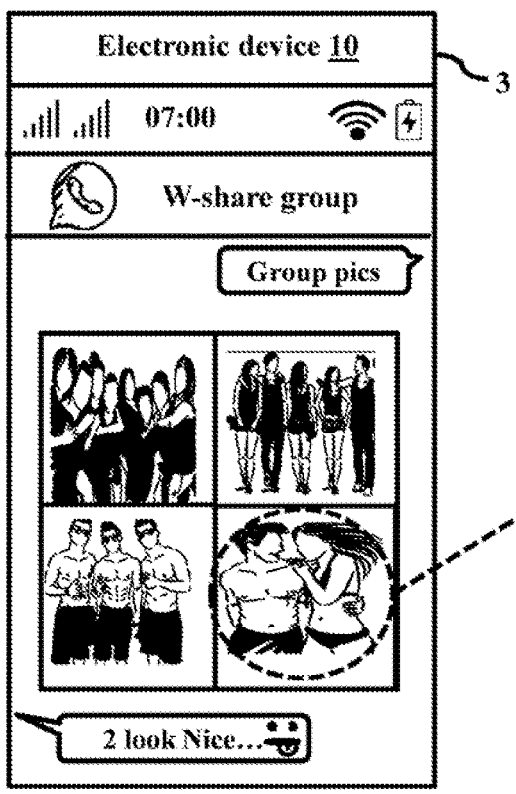
Figure 1A:
Figure 1B:
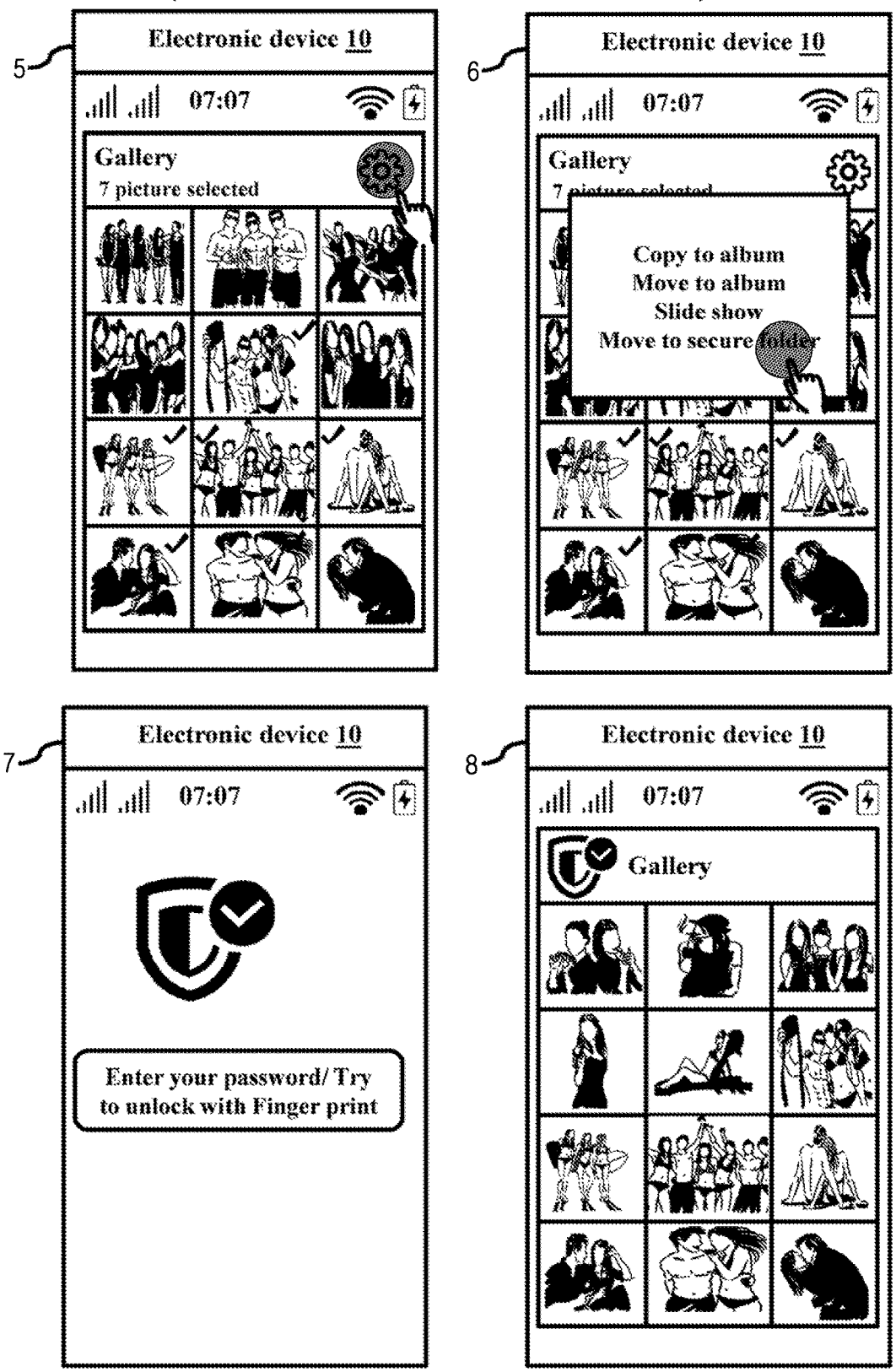

Various example embodiments herein and the various features and advantageous details thereof are explained more fully with reference to non-limiting embodiments that are illustrated in the accompanying drawings and detailed in the following description. Descriptions of well-known components and processing techniques may be omitted so as to not unnecessarily obscure the embodiments herein. The various example embodiments described herein are not necessarily mutually exclusive, as various embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the disclosure herein.

As is traditional in the field, embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware. The circuits may, for example, be embodied in one or more semiconductor chips, or on substrate supports such as printed circuit boards and the like. The circuits of a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

Accordingly, the embodiments herein provide a method for managing private content by an electronic device. The method may include: displaying, by the electronic device, content (e.g. a text, an image frame, an audio, a video, etc.) on a screen of the electronic device, where the content is stored in a non-secure folder of the electronic device. Further, the method includes extracting, by the electronic device, a feature(s) (e.g. a textual concept, a facial recognition, an action recognition, and Region of Interest (RoI) detection, etc.) of the displayed content to categorize the displayed content using an ML model. Further, the method includes detecting, by the electronic device, globally objectionable private content and/or user-specific objectionable private content. Further, the method includes categorizing, by the electronic device, the displayed content into the private content or public content based on the globally objectionable private content and/or the user-specific objectionable private content. Further, the method includes displaying, by the electronic device, a recommendation on the screen of the electronic device for transferring the displayed content into a secure folder of the electronic device in response to categorizing the displayed content as the private content. Further, the method includes detecting, by the electronic device, an event to transfer the private content into the secure folder of the electronic device. Further, the method includes automatically transferring, by the electronic device, the private content from the non-secure folder to the secure folder of the electronic device in response to detecting the event.

Accordingly, the example embodiments herein provide an electronic device for managing the private content. The electronic device includes a content controller (e.g., including various processing circuitry and/or executable program instructions) coupled with a processor and a memory. The content controller is configured to display the content on the screen of the electronic device, where the content is stored in the non-secure folder of the electronic device. Further, the content controller is configured to extract the feature(s) of the displayed content to categorize the displayed content using the ML model. Further, the content controller is configured to detect the globally objectionable private content and the user-specific objectionable private content. Further, the content controller is configured to categorize the displayed content into the private content or public content based on the globally objectionable private content and/or the user-specific objectionable private content. Further, the content controller is configured to display the recommendation on the screen of the electronic device for transferring the displayed content into the secure folder of the electronic device in response to categorizing the displayed content as the private content. Further, the content controller is configured to detect the event to transfer the private content into the secure folder of the electronic device. Further, the content controller is configured to automatically transfer the private content from the non-secure folder to the secure folder of the electronic device in response to detecting the event.

Unlike existing methods and systems, the various example embodiments allow the electronic device to automatically transfer the private content from the non-secure folder to the secure folder of the electronic device in response to detecting the event on the electronic device, which is time-saving and convenient for a user of the electronic device. The private content is detected by the globally objectionable private content and/or user-specific objectionable private content by extracting a feature(s) of displayed content using the ML model.

Unlike existing methods and systems, various example embodiments of the disclosure allow the electronic device to detect the globally objectionable private content by categorizing the displayed content as the private content when a private body part of a human is visible in the displayed content and/or the objectionable element is present in the displayed content, or determining a cumulative confidence score to categorize the displayed content as the private content or the public content when the private body part of the human is not visible in the displayed content and/or the objectionable element is not present in the displayed content. The displayed content is categorized as the private content if the cumulative confidence score is more than or equal to a pre-defined threshold value and the displayed content is categorized as the public content if the cumulative confidence score is less than pre-defined threshold value.

Unlike existing methods and systems, various example embodiments allow the electronic device to detect the user-specific objectionable private content by determining a user preference for the private content and the public content from a plurality of domains (e.g. image(s), text(s), video(s), etc.) of the electronic device using a multi-modal joint embedding space and correlating the extracted feature(s) with a stored template(s) to categorize the displayed content into the private content or the public content.

Unlike existing methods and systems, various example embodiments of the disclosure allow the electronic device to switch quickly between the non-secure folder of the electronic device and the secure folder of the electronic device by receiving a gesture from the user of the electronic device. Furthermore, switching from the non-secure folder of the electronic device to the secure folder of the electronic device requires a user authentication, and switching from the secure folder of the electronic device to the non-secure folder of the electronic device does not require the user authentication.

Unlike existing methods and systems, various example embodiments of the disclosure allow the electronic device to automatically recommend a suitable action(s) (e.g. hiding, encrypting, transferring to the secure folder, masking, etc.) when the displayed content is detected as the private content.

Referring now to the drawings and more particularly to FIGS. 2 through 7, where similar reference characters denote corresponding features consistently throughout the figures, there are shown various example embodiments.

Figure 2:
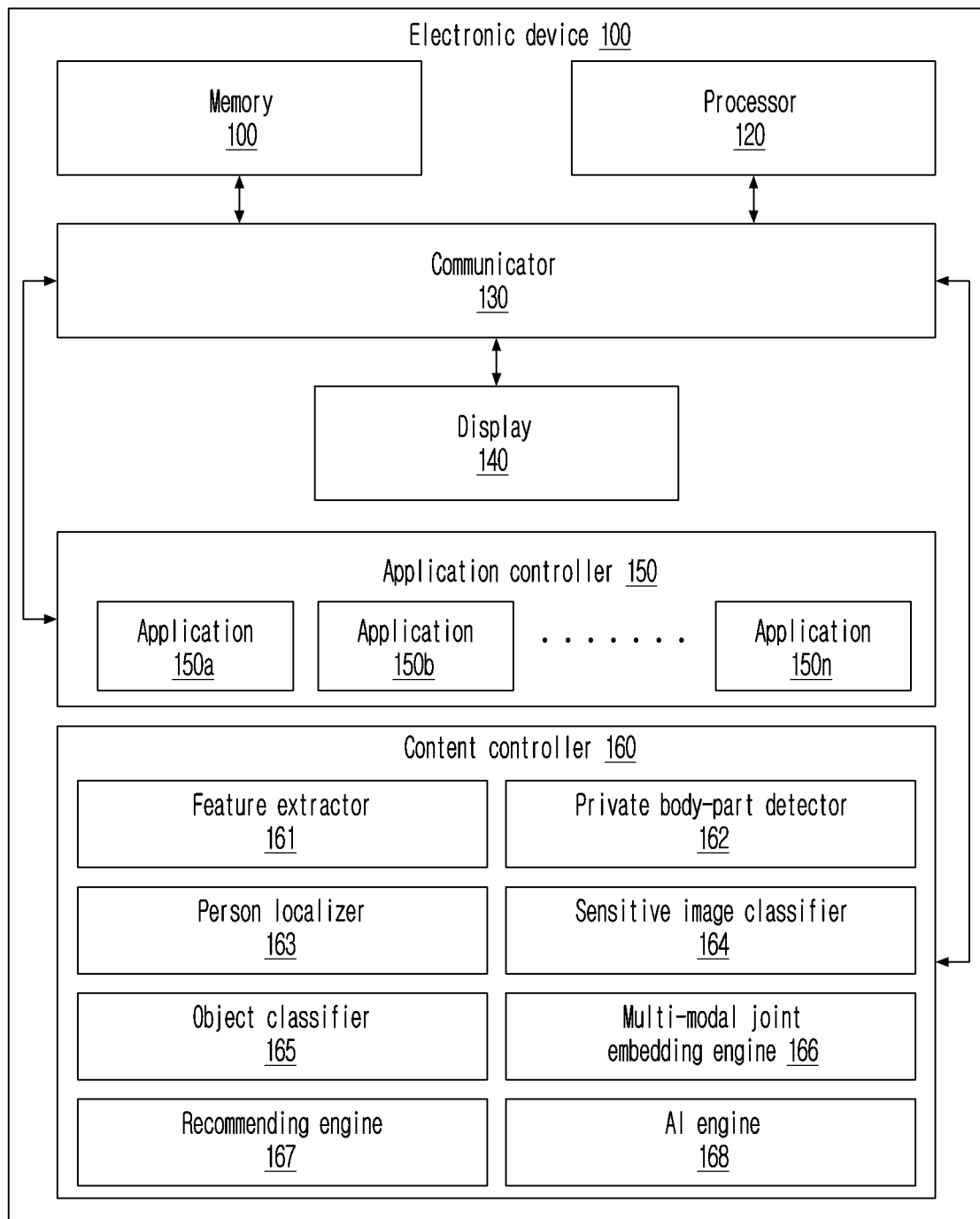
FIG. 2 is a block diagram illustrating an example configuration of an electronic device for managing the private content by automatically detecting a globally objectionable private content or a user-specific objectionable private content in the electronic device, according to various embodiments.

FIG. 2 is a block diagram illustrating an example configuration of an electronic device (100) for managing private content by automatically detecting a globally objectionable private content or a user-specific objectionable private content in the electronic device (100), according to various embodiments. The electronic device (100) can be, for example, but not limited to a smartphone, a tablet, a laptop, an internet of things (IoT) device, a User Equipment (UE), a wearable device, or the like.

In an embodiment, the electronic device (100) includes a memory (110), a processor (e.g., including processing circuitry) (120), a communicator (e.g., including communication circuitry) (130), a display (140) (e.g., screen (140) of the electronic device (100)), an application controller (150) and a content controller (e.g., including various processing circuitry and/or executable program instructions) (160).

The memory (110) stores content in a non-secure folder or a secure folder, an extracted feature(s) of displayed content, a database of globally objectionable private content, and user-specific objectionable private content to detect private content in the electronic device (100) using the content controller (160), and authorized data of a user of the electronic device (100). Further, the memory (110) also stores instructions to be executed by the processor (120). The memory (110) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (110) may, in some examples, be considered a non-transitory storage medium. The term "non-transitory" may indicate that the storage medium is not embodied in a carrier wave or a propagated signal. However, the term "non-transitory" should not be interpreted that the memory (110) is non-movable. In some examples, the memory (110) can be configured to store larger amounts of information. In certain examples, a non-transitory storage medium may store data that can, over time, change (e.g., in Random Access Memory (RAM) or cache). The memory (110) can be an internal storage unit or it can be an external storage unit of the electronic device (100), a cloud storage, or any other type of external storage.

The processor (120) may include various processing circuitry and communicates with the memory (110), the communicator (130), the display (140), the application controller (150), and the content controller (160). The processor (120) is configured to execute instructions stored in the memory (110) and to perform various processes. The processor (120) may include one or a plurality of processors, maybe a general-purpose processor, such as a central processing unit (CPU), an application processor (AP), or the like, a graphics-only processing unit such as a graphics processing unit (GPU), a visual processing unit (VPU), and/or an Artificial intelligence (AI) dedicated processor such as a neural processing unit (NPU).

The communicator (130) includes an electronic circuit specific to a standard that enables wired or wireless communication. The communicator (130) is configured for communicating internally between internal hardware components and with external devices via one or more networks. The display (140) is configured to display various functionality of application (150)/display content on the screen (140) of the electronic device (100).

The application controller (150) is configured to control a plurality of applications (150a-150n) of each application of the electronic device (100). Examples for the application (150a-150n) are, but not limited to a media application, a web application, a video player application, a camera application, a game application, a business application, an education application, a lifestyle application, an entertainment application, a utility application, a travel application, etc. In an embodiment, the content controller (160) is implemented by processing circuitry such as logic gates, integrated circuits, microprocessors, microcontrollers, memory circuits, passive electronic components, active electronic components, optical components, hardwired circuits, or the like, and may optionally be driven by firmware (e.g., executable program instructions). The circuits may, for example, be embodied in one or more semiconductors.

The content controller (160) is configured to display content on the screen (140) of the electronic device (100), where the content is stored in the non-secure folder of the electronic device (100). Further, the content controller (160) is configured to extract the feature(s) of the displayed content to categorize the displayed content using an ML model (i.e. AI engine). Further, the content controller (160) is configured to detect the globally objectionable private content and/or the user-specific objectionable private content. Further, the content controller (160) is configured to categorize the displayed content into the private content or public content based on the globally objectionable private content and/or the user-specific objectionable private content. Further, the content controller (160) is configured to display a recommendation (e.g. move to the secure folder) on the screen (140) of the electronic device (100) for transferring the displayed content into a secure folder of the electronic device (100) in response to categorizing the displayed content as the private content. Further, the content controller (160) is configured to detect an event to transfer the private content into the secure folder of the electronic device (100). Further, the content controller (160) is configured to automatically transfer the private content from the non-secure folder to the secure folder of the electronic device (100) in response to detecting the event. Further, the content controller (160) is configured to determine whether a private body part of a human is visible in the displayed content and/or an objectionable element is present in the displayed content. Further, the content controller (160) is configured to categorize the displayed content as the private content in response to determining that the private body part of the human is visible in the displayed content and/or the objectionable element is present in the displayed content. Further, the content controller (160) is configured to determine a cumulative confidence score to categorize the displayed content as the private content or the public content in response to determining that the private body part of the human is not visible in the displayed content and/or the objectionable element is not present in the displayed content.

The displayed content is categorized as the private content if the cumulative confidence score is more than or equal to a pre-defined (e.g., specified) threshold value and the displayed content is categorized as the public content if the cumulative confidence score is less than the pre-defined threshold value. The private body part of the human may include, for example, and without limitation, a belly of the human, buttocks of the human, breasts of the human, and genitalia of the human. The objectionable element may include, for example, and without limitation, a cigarette, a beer bottle, a wine bottle, a champagne bottle, a beer glass, a wine glass, a whiskey glass, a cocktail glass, biometric data of a user, medical information of the user, Personally Identifiable Financial Information (PIFI) of the user and unique identifiers of the user.

Further, the content controller (160) is configured to detect that the private body part of the human is not visible in the image frame. Further, the content controller (160) is configured to determine whether multiple human blocks are identified in the image frame. Further, the content controller (160) is configured to determine a first threshold value (e.g., a minimum confidence score of a sensitive image classifier below which the content is not deemed for consideration under sensitive category) in response to determining that the multiple human blocks are identified in the image frame. Further, the content controller (160) is configured to determine a second threshold value (e.g., a minimum confidence score of the sensitive image classifier below which the content is not deemed for consideration under sensitive category) in response to determining that the multiple human blocks are not identified in the image frame. Further, the content controller (160) is configured to determine the cumulative confidence score by adding the first threshold value and the second threshold value.

Further, the content controller (160) is configured to detect a block proximity threshold (i.e. a minimum proximity value between two detected human blocks below which the human blocks are merged into one human block). Further, the content controller (160) is configured to determine whether the multiple human blocks meet the block proximity threshold. Further, the content controller (160) is configured to group the multiple human blocks into a single block and passes to the sensitive image classifier to calculate the first threshold value in response to determining that the multiple human blocks meet the block proximity threshold. Further, the content controller (160) is configured to individual block passes to the sensitive image classifier to calculate the first threshold value in response to determining that the multiple human blocks do not meet the block proximity threshold.

Further, the content controller (160) is configured to determine a user preference for the private content and the public content from a plurality of domains of the electronic device (100) using a multi-modal joint embedding space. Further, the content controller (160) is configured to store the user preference as a template(s) in the electronic device (100). Further, the content controller (160) is configured to correlative the extracted feature(s) with the stored template(s) to categorize the displayed content into the private content or the public content.

Further, the content controller (160) is configured to detect that the displayed content as the private content and receive a user input (e.g. enter password) on the screen (140) of the electronic device (100). Further, the content controller (160) is configured to determine whether the user input is authorized. Further, the content controller (160) is configured to initiate the transformation of the displayed content from the non-secure folder to the secure folder of the electronic device (100) in response to determining that the user input is authorized. Further, the content controller (160) is configured to not initiate the transformation of the displayed content from the non-secure folder to the secure folder of the electronic device (100) in response to determining that the user input is not authorized.

The event on the electronic device (100) may include a gesture of the user of the electronic device (100) to shift the private content into the secure folder of the electronic device (100), and a gesture of the user of the electronic device (100) to switch quickly between the non-secure folder of the electronic device (100) and the secure folder of the electronic device (100). Furthermore, switching from the non-secure folder of the electronic device (100) to the secure folder of the electronic device (100) requires a user authentication, and switching from the secure folder of the electronic device (100) to the non-secure folder of the electronic device (100) does not require the user authentication.

Further, the content controller (160) is configured to automatically recommend a suitable action(s) (e.g. hiding, encrypting, transferring to the secure folder, masking, etc.) when the displayed content is detected as the private content.

In an embodiment, the content controller (160) includes a feature extractor (161), a private body-part detector (162), a person localizer (163), a sensitive image classifier (164), an object classifier (165), a multi-model joint embedding engine (166), a recommending engine (167) and an Artificial intelligence (AI) engine (168), each of which may include various processing circuitry and/or executable program instructions.

In an embodiment, the feature extractor (161) extracts the feature(s) of the displayed content to categorize the displayed content using the ML model. The feature extractor (161) separates text(s), image(s), and video(s) to extract features such as textual concept extraction, facial recognition, action recognition, key frame detection, and generic Region of Interest (ROI) associated with the displayed content on the screen (140) of the electronic device (100). Furthermore, the feature extractor (161) sends the extracted feature(s) to the multi-model joint embedding engine (166) for further processing to detect the displayed content as the private content or the public content.

In an embodiment, the private body-part detector (162) detects the globally objectionable private content to categorize the displayed content into the private content or the public content. The private body-part detector (162) determines whether the private body part of the human (e.g. full or partial nudity, high skin exposure, etc.) is visible in the displayed content and/or the objectionable element is present in the displayed content. Furthermore, the private body-part detector (162) categorizes the displayed content as the private content in response to determining that the private body part of the human is visible in the displayed content and/or the objectionable element is present in the displayed content.

In an embodiment, the private body-part detector (162) includes learned weights for a deep learning ML model (i.e. AI engine (168)) that is used to locate private body part(s) in the displayed content. The private body-part detector (162) assigns a confidence score to bounding rect(s); if the confidence score exceeds a specific threshold, the private body-part detector (162) anticipates the private body part(s) and classifies the displayed content as the private content. If no body parts are identified, no boundary rect(s) are returned, and the displayed content is classified as the public content. Then, the private body-part detector (162) sends the displayed content to the person localizer (163) when the displayed content is categorized as the public content, as per the novel proposed method/pipeline, categorize the displayed content as the private content or the public content based on the cumulative confidence score.

In an embodiment, the person localizer (163) receives the displayed content from the private body-part detector (162) when the displayed content is categorized as the public content by the private body-part detector (162). The person localizer (163) determines whether multiple human blocks are identified in an image frame (e.g. displayed content) and determines the first threshold value (e.g. S1) in response to determining that the multiple human blocks are identified in the image frame. The person localizer (163) determines the second threshold value (e.g. S2) in response to determining that the multiple human blocks are not identified in the image frame. To determine the first threshold value, the person localizer (163) detects the block proximity threshold and determines whether the multiple human blocks meet the block proximity threshold. Furthermore, the person localizer (163) groups the multiple human blocks into a single block and passes to the sensitive image classifier (164), as per novel proposed method/pipeline, to calculate the first threshold value in response to determining that the multiple human blocks meet the block proximity threshold. Furthermore, the person localizer (163) individual block passes to the sensitive image classifier (164), as per the novel proposed method/pipeline, to calculate the first threshold value in response to determining that the multiple human blocks do not meet the block proximity threshold.

In an embodiment, the person localizer (163) includes learned weights for the deep learning ML model (e.g., AI engine (168)) that is used to locate human(s) in the displayed content. The person localizer (163) assigns a confidence score to bounding rect(s); if the confidence score exceeds a specific threshold, the person localizer (163) anticipates the private human(s). If no human(s) is identified, and no boundary rect(s) are returned.

In an embodiment, the sensitive image classifier (164) determines the cumulative confidence score by adding the first threshold value and the second threshold value (e.g. S1+S2). Then, the displayed content is categorized as the private content if the cumulative confidence score is more than or equal to the pre-defined threshold value and the displayed content is categorized as the public content if the cumulative confidence score is less than the pre-defined threshold value. In an embodiment, the sensitive image classifier (164) includes learned weights for the deep learning ML model (i.e. AI engine (168)) that is used to classify the displayed content into, for example, Not Safe for Work (NSFW) class. In addition, the sensitive image classifier (164) classifies over 80 types of other classes. The sensitive image classifier (164) detects 81 class labels for the displayed content. If the NSFW class is detected above a certain threshold, the displayed content is considered to be NSFW or sensitive.

In an embodiment, the object classifier (165) detects the objectionable element in the displayed content. Example of the objectionable element, but not limited to, the cigarette, the beer bottle, the wine bottle, the champagne bottle, the beer glass, the wine glass, the whiskey glass, the cocktail glass, the biometric data of the user, the medical information of the user, the PIFI of the user and the unique identifiers of the user. The object classifier (165) categorizes the displayed content as the private content if the probability of occurrence of any of these objectionable elements above a defined threshold.

In an embodiment, the object classifier (165) includes learned weights for the deep learning ML model (i.e. AI engine (168)) that is used to classify the displayed content over 82 types of other classes. The object classifier (165) detects 84 class labels for the displayed content. For example, if alcohol glasses or alcohol bottle classes are detected above a certain threshold, the image/displayed content is considered to be containing alcohol.

Figure 4A:
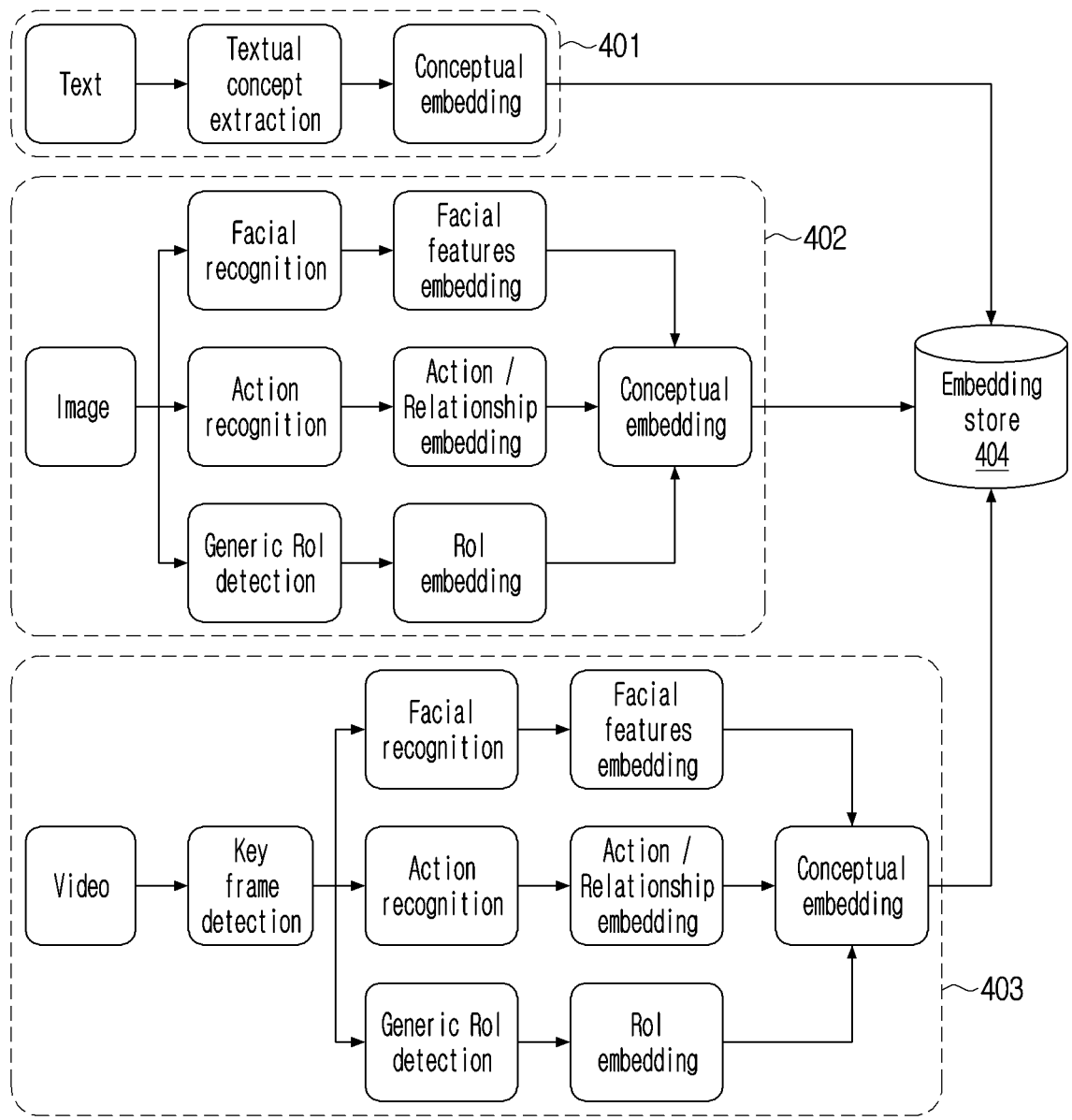
FIGS. 4A and 4B are diagrams illustrating an example scenario in which the electronic device uses a multi-modal joint embedding space to identify a user preference for the private content and public content from a plurality of domains of the electronic device, according to various embodiments.
Figure 4B:
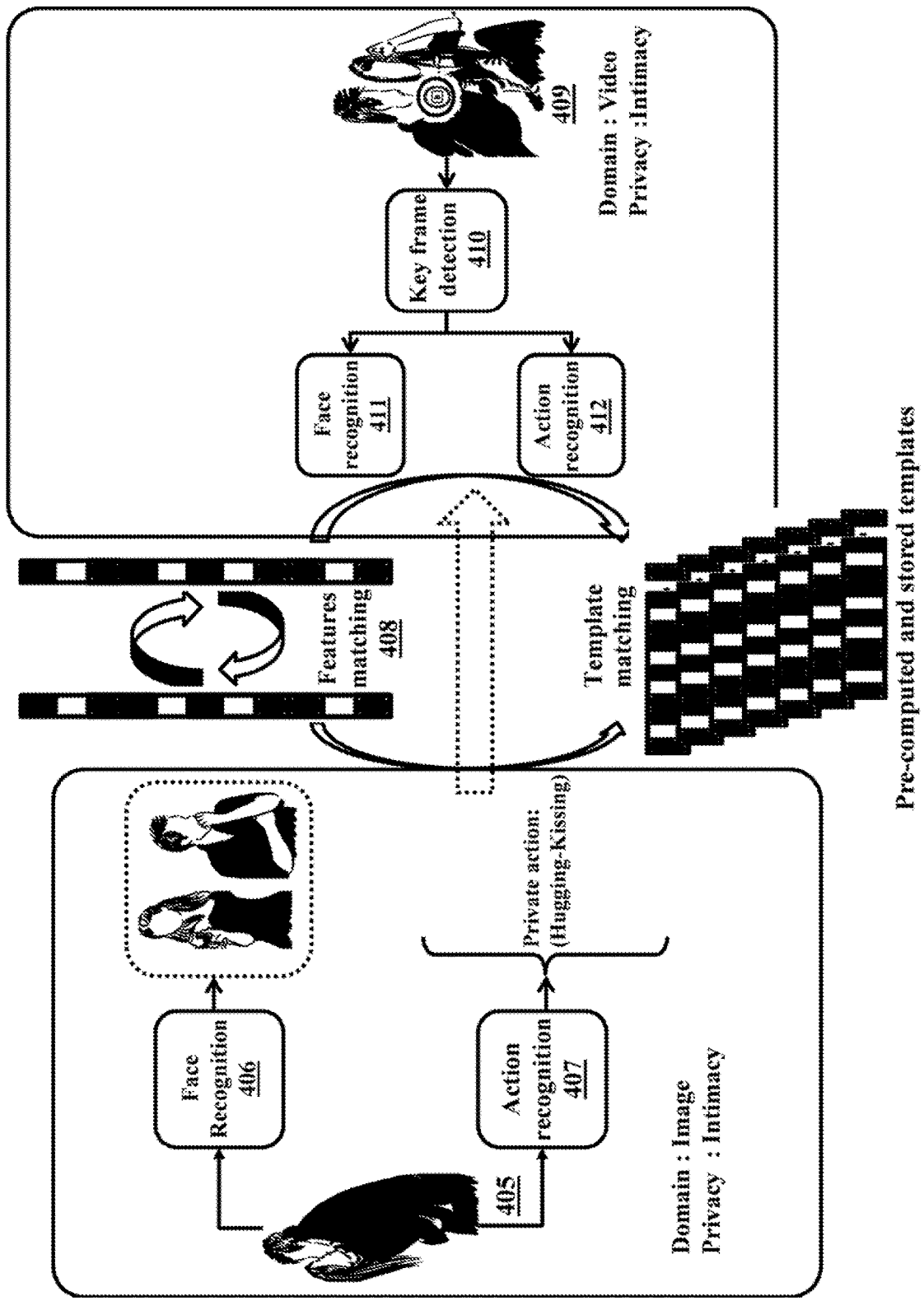

In an embodiment, the multi-model joint embedding engine (166) determines the user preference for the private content and the public content from the plurality of domains of the electronic device (100) using the multi-modal joint embedding space, an example is given in FIGS. 4A and 4B. Further, the multi-model joint embedding engine (166) stores the user preference as the template(s) in the electronic device (100) and correlates the extracted feature(s) with the stored template(s) to categorize the displayed content into the private content or the public content. The multi-model joint embedding engine (166) translates privacy concepts from one domain (for example, image) to another domain (for example, videos or text), as part of personalized privacy. The multi-model joint embedding engine (166) learns privacy concepts from user selections in the image domain.

For example, the user manually selects a set of images and categorizes them as private content, and the multi-model joint embedding engine (166) learns that the most common features indicate "smoking and drinking." The multi-model joint embedding engine (166) applies the same learning to different domains, such as videos. As private content, the user may be automatically recommended video(s) featuring smoking and drinking. In another example, the user manually selects a set of messages and categorizes them as private content, and the multi-model joint embedding engine (166) learns that the most common features indicate "bank account transactions." The multi-model joint embedding engine (166) applies the same learning to different domains, such as images. As private content, the user may be automatically recommended image(s)/screenshot(s) featuring bank account transactions/financial transactions.

In an embodiment, the recommending engine (167) provides the recommendation on the screen (140) of the electronic device (100) for transferring the displayed content into the secure folder of the electronic device (100) in response to categorizing the displayed content as the private content. Further, the recommending engine (167) detects the event (e.g. authentication process) to transfer the private content into the secure folder of the electronic device (100). Further, the recommending engine (167) automatically transfers the private content from the non-secure folder to the secure folder of the electronic device (100) in response to detecting the event.

At least one of the plurality of modules/components, as mentioned above, may be implemented through the AI engine (168). A function associated with the AI engine (168) may be performed through memory (110) and the processor (120). One or a plurality of processors controls the processing of the input data in accordance with a predefined operating rule or the AI engine (168) stored in the non-volatile memory and the volatile memory. The predefined operating rule or artificial intelligence model is provided through training or learning.

Being provided through learning may refer, for example to, by applying a learning process to a plurality of learning data, a predefined operating rule or the AI engine (168) of the desired characteristic is made. The learning may be performed in the electronic device (100) itself in which AI according to an embodiment is performed, and/or may be implemented through a separate server/system.

The AI engine (168) may include a plurality of neural network layers. Each layer has a plurality of weight values and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks. The learning process may refer, for example, to a method for training a predetermined target device (for example, a robot) using a plurality of learning data to cause, allow, or control the target device to make a determination or prediction. Examples of learning processes include, but are not limited to, supervised learning, unsupervised learning, semi-supervised learning, or reinforcement learning.

Although the FIG. 2 shows various hardware components of the electronic device (100) it is to be understood that other embodiments are not limited thereto. In various embodiments, the electronic device (100) may include less or more number of components. Further, the labels or names of the components are used merely for illustrative purposes and does not limit the scope of the disclosure. One or more components can be combined together to perform the same or substantially similar function to manage the private content in the electronic device (100).

Figure 3A:
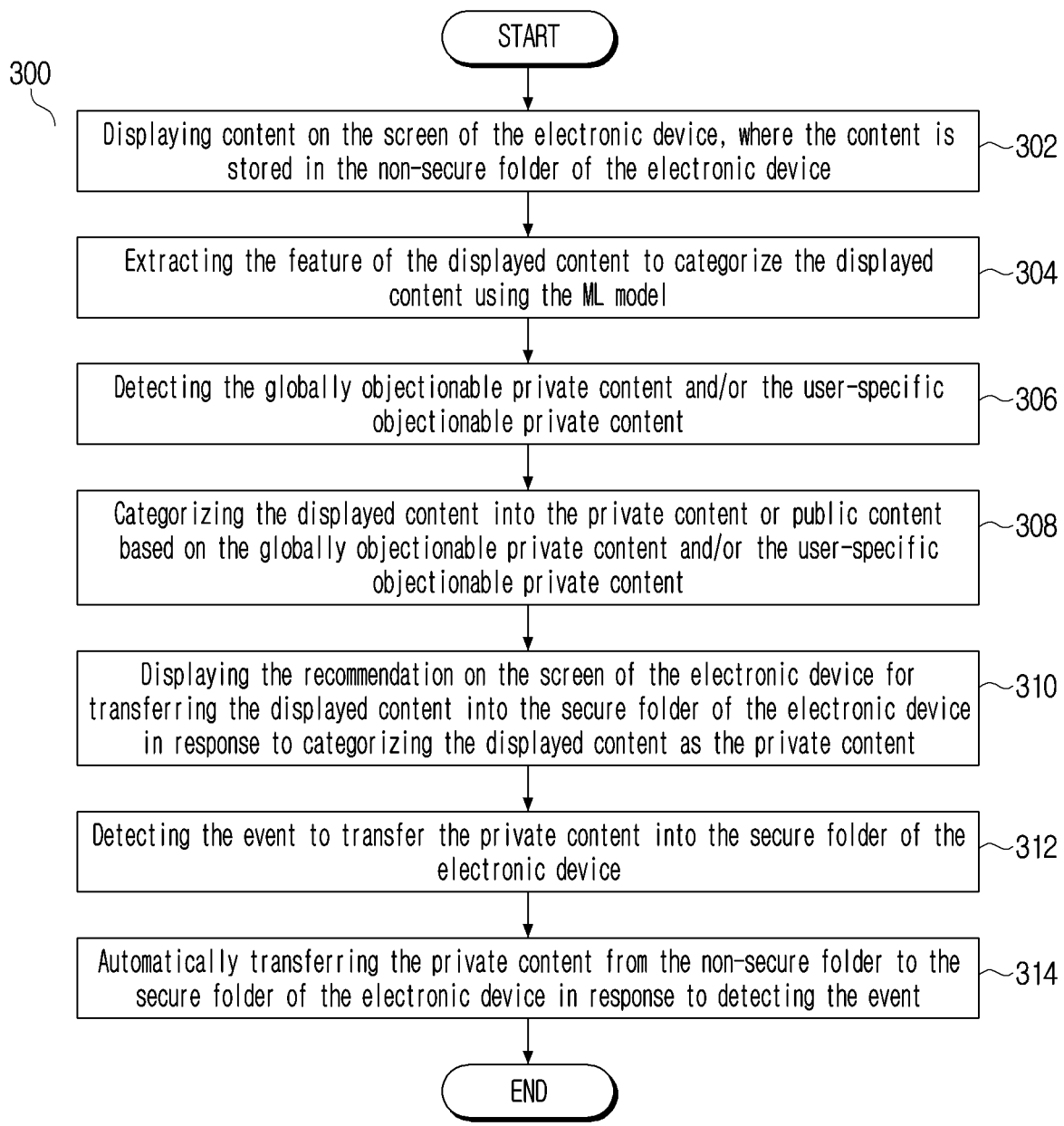
FIG. 3A is a flowchart illustrating an example method for managing the private content by automatically detecting the globally objectionable private content or the user-specific objectionable private content in the electronic device, according to various embodiments.

FIG. 3A is a flowchart (300) illustrating an example method for managing private content by automatically detecting the globally objectionable private content or the user-specific objectionable private content in the electronic device (100), according to various embodiments. The operations (302-314) may be performed by the electronic device (100).

At operation 302, the method includes displaying the content on the screen (140) of the electronic device (100), where the content is stored in the non-secure folder of the electronic device (100). At operation 304, the method includes extracting the feature(s) of the displayed content to categorize the displayed content using the ML model. At operation 306, the method includes detecting the globally objectionable private content and/or the user-specific objectionable private content. At operation 308, the method includes categorizing the displayed content into the private content or public content based on the globally objectionable private content and/or the user-specific objectionable private content. At operation 310, the method includes displaying the recommendation on the screen (140) of the electronic device (100) for transferring the displayed content into the secure folder of the electronic device (100) in response to categorizing the displayed content as the private content. At operation 312, the method includes detecting the event to transfer the private content into the secure folder of the electronic device (100). At operation 314, the method includes automatically transferring the private content from the non-secure folder to the secure folder of the electronic device (100) in response to detecting the event.

Figure 3B:
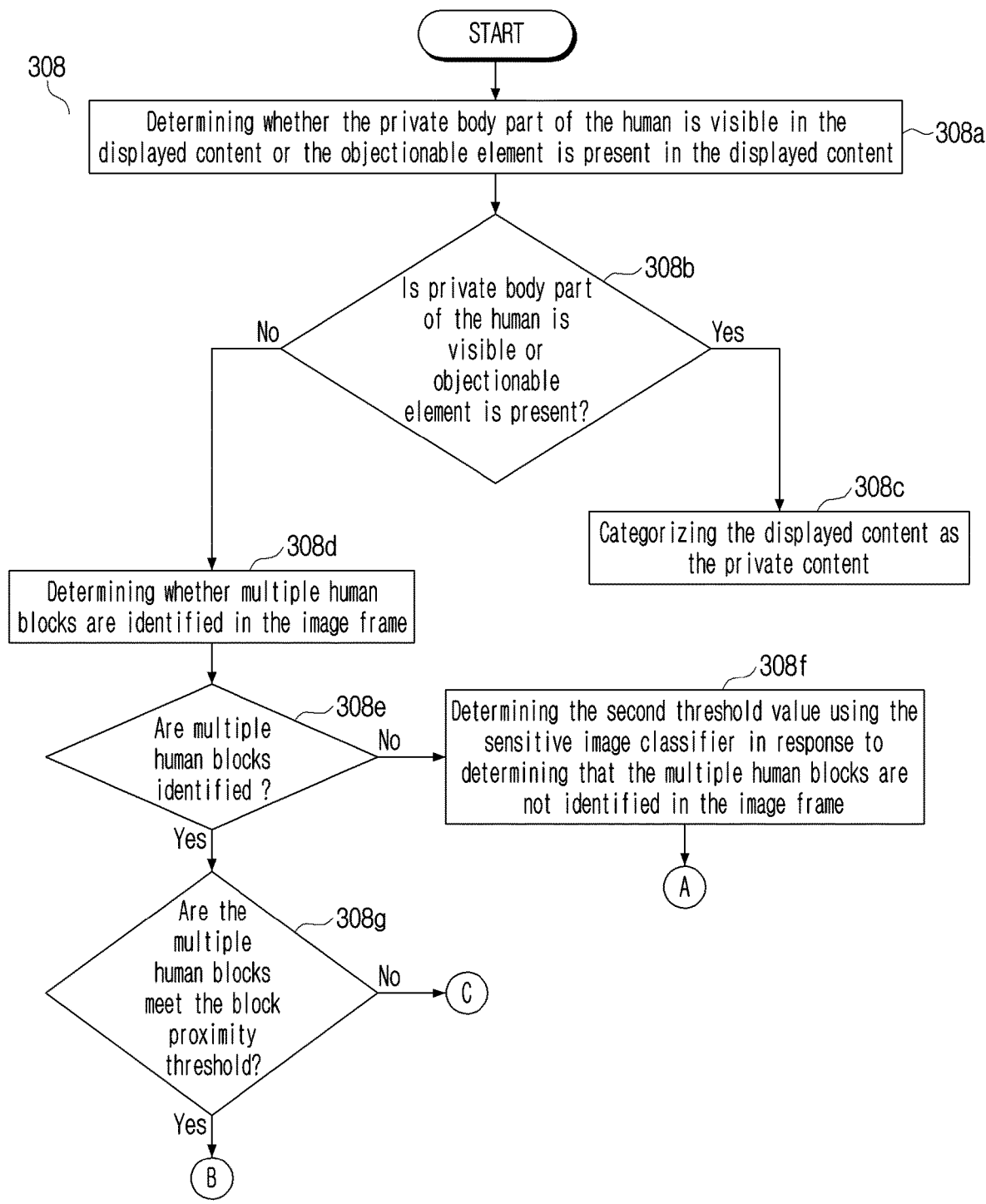
FIGS. 3B and 3C is a flowchart illustrating example operations for automatically detecting the globally objectionable private content in the electronic device, according to various embodiments.
Figure 3C:
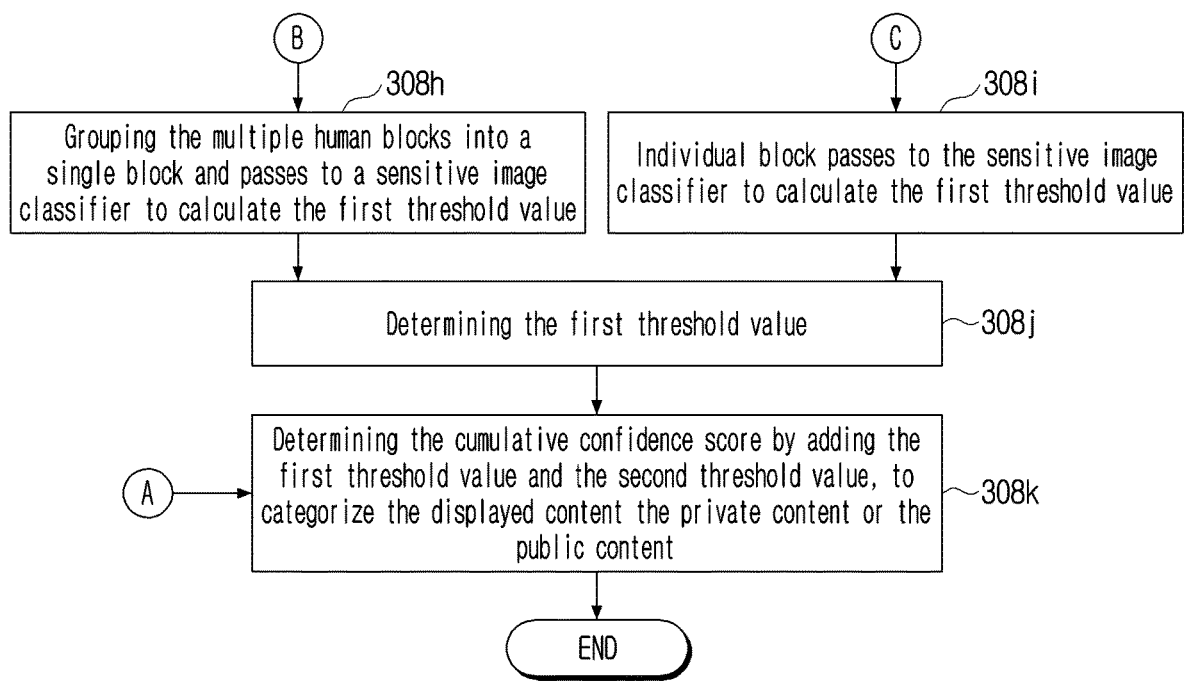

FIGS. 3B and 3C is a flowchart (308) illustrating various example operations for automatically detecting the globally objectionable private content in the electronic device (100), according to various embodiments. The operations (308a-308k) may be performed by the electronic device (100).

At operations 308a-308b, the method includes determining whether the private body part of the human is visible in the displayed content or the objectionable element is present in the displayed content. At operation 308c, the method includes categorizing the displayed content as the private content in response to determining that the private body part of the human is visible in the displayed content or the objectionable element is present in the displayed content (Yes at 308b). At operations 308d-308e (No at 308b), the method includes determining whether multiple human blocks are identified in the image frame (displayed content). At operation 308f, the method includes determining the second threshold value using the sensitive image classifier (164) in response to determining that the multiple human blocks are not identified in the image frame (No at 308e). At 308g, the method includes determining whether the multiple human blocks meet the block proximity threshold (Yes at 308e). At operation 308h, the method includes grouping the multiple human blocks into a single block and passes to the sensitive image classifier (164) to calculate the first threshold value in response to determining that the multiple human blocks meet the block proximity threshold. At operation 308i, the method includes individual block passes to the sensitive image classifier (164) to calculate the first threshold value in response to determining that the multiple human blocks do not meet the block proximity threshold. At operation 308j, the method includes determining the first threshold value. At operation 308k, the method includes determining the cumulative confidence score by adding the first threshold value and the second threshold value, to categorize the displayed content as the private content or the public content.

Figure 3D:
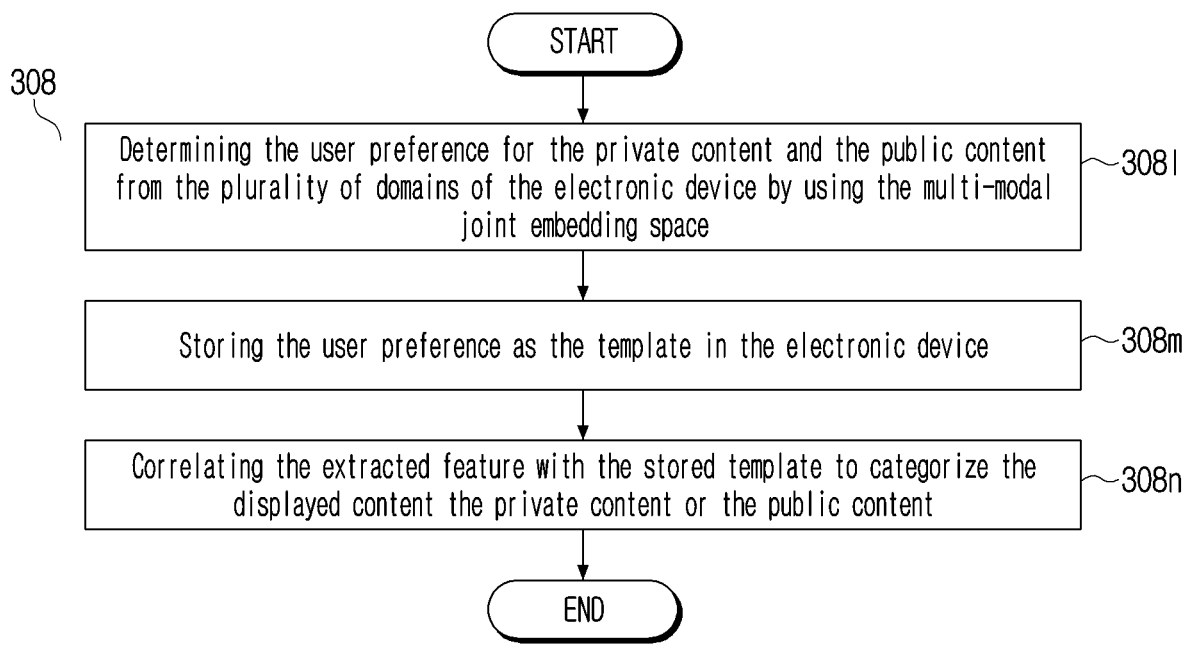
FIG. 3D is a flowchart illustrating example operations for automatically detecting the user-specific objectionable private content in the electronic device, according to various embodiments.

FIG. 3D is a flowchart (308) illustrating various example operations for automatically detecting the user-specific objectionable private content in the electronic device (100), according to various embodiments. The operations (308l-308n) may be performed by the electronic device (100).

At operation 308l, the method includes determining the user preference for the private content and the public content from the plurality of domains of the electronic device (100) using the multi-modal joint embedding space. At operation 308m, the method includes storing the user preference as the template in the electronic device (100). At operation 308n, the method includes correlating the extracted feature(s) with the stored template to categorize the displayed content as the private content or the public content.

The various actions, acts, blocks, steps, or the like in the flow diagram (300, 308) may be performed in the order presented, in a different order, or simultaneously. Further, in various embodiments, some of the actions, acts, blocks, steps, or the like may be omitted, added, modified, skipped, or the like without departing from the scope of the disclosure.

FIGS. 4A and 4B are diagrams illustrating an example scenario in which the electronic uses the multi-modal joint embedding space to identify the user preference for the private content and public content from the plurality of domains of the electronic device (100), according to various embodiments.

The multi-model joint embedding engine (166) determines the user preference for the private content and the public content from the plurality of domains (e.g. text (401), image (402), and video (403)) of the electronic device (100) using the multi-modal joint embedding space (e.g., embedding store (404), this data base is part of the memory (110)). Further, the multi-model joint embedding engine (166) stores the user preference as the template(s) in the electronic device (100) and correlates the extracted feature(s) with the stored template(s) to categorize the displayed content into the private content or the public content.

An example scenario where the multi-model joint embedding engine (166) translates privacy concepts from one domain (for example, image (405)) to another domain (for example, video (409)), as part of personalized privacy. The multi-model joint embedding engine (166) extracts feature(s) from displayed content (405) by conducting face recognition (406) and action recognition (407), such as hugging and kissing. The multi-model joint embedding engine (166) determines the user preference for the private content and the public content from the plurality of domains (e.g. video (409)) of the electronic device (100) using the multi-modal joint embedding space (404), where the video (409) have same features(s), such as hugging, feature(s) are extracted by conducting face recognition (411), action recognition (412), and key detection (410). Furthermore, the user preference for the video (409) as the private content, and this user preference is already stored as the template(s) in the electronic device (100). The multi-model joint embedding engine (166) then correlates (408) the extracted feature(s) with the stored template(s) to categorize the displayed content as the private content.

Figure 5A:
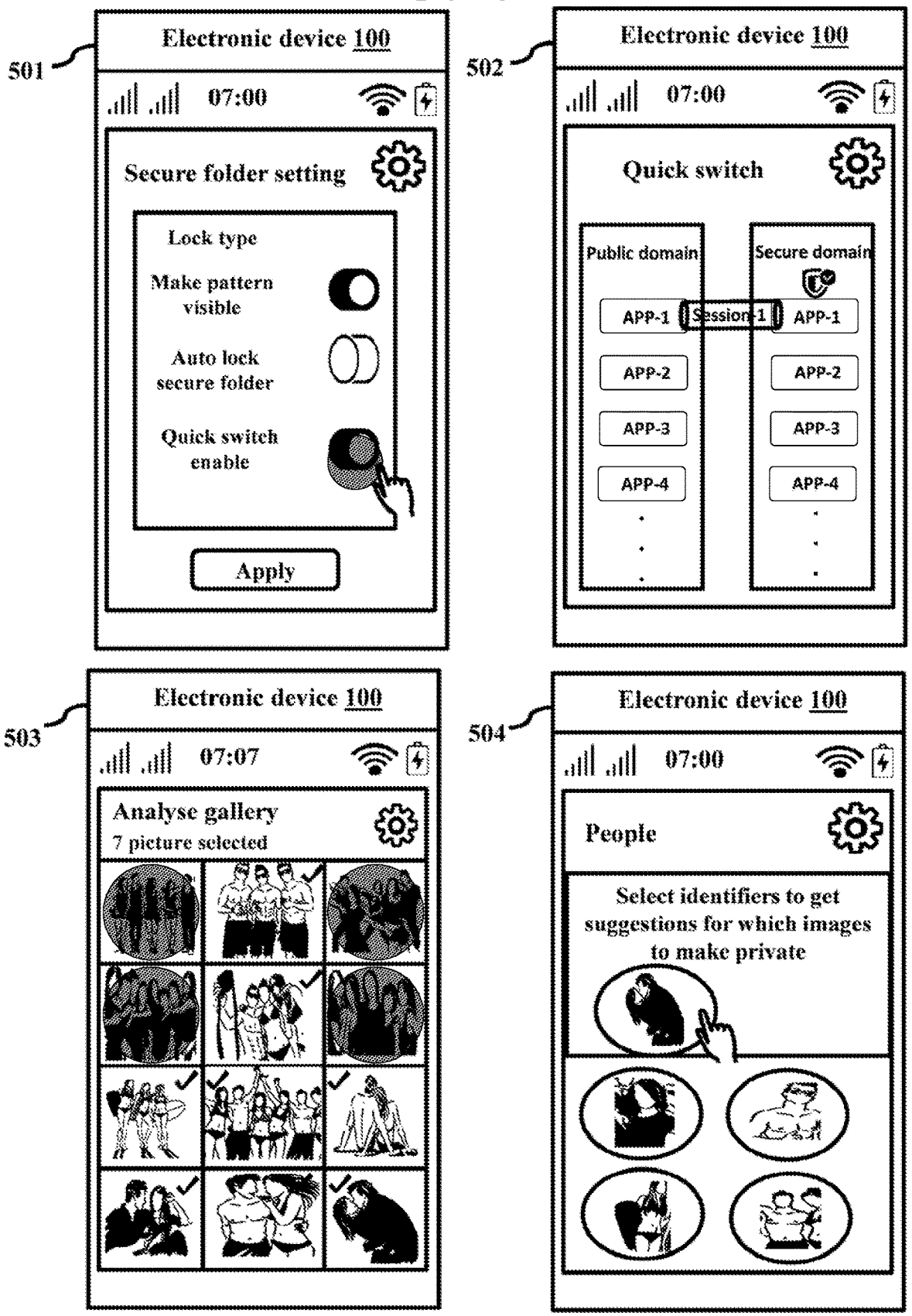
FIGS. 5A, 5B and 5C are diagrams illustrating an example scenario in which the electronic device manages the private content by enabling a quick switch option to switch quickly between a non-secure folder of the electronic device and a secure folder of the electronic device based on the user preference for the private content and the public content, according to various embodiments.
Figure 5B:
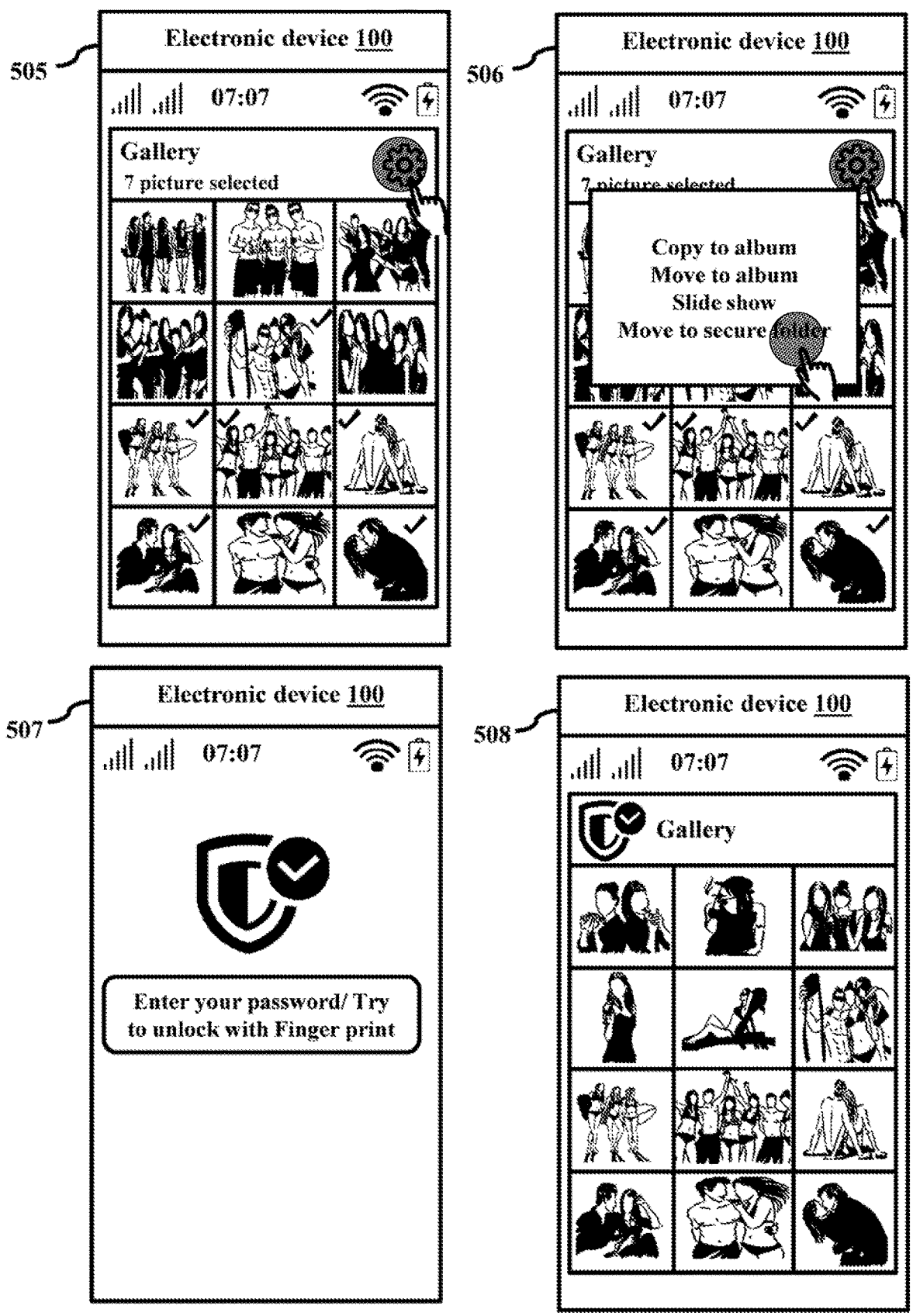
Figure 5C:
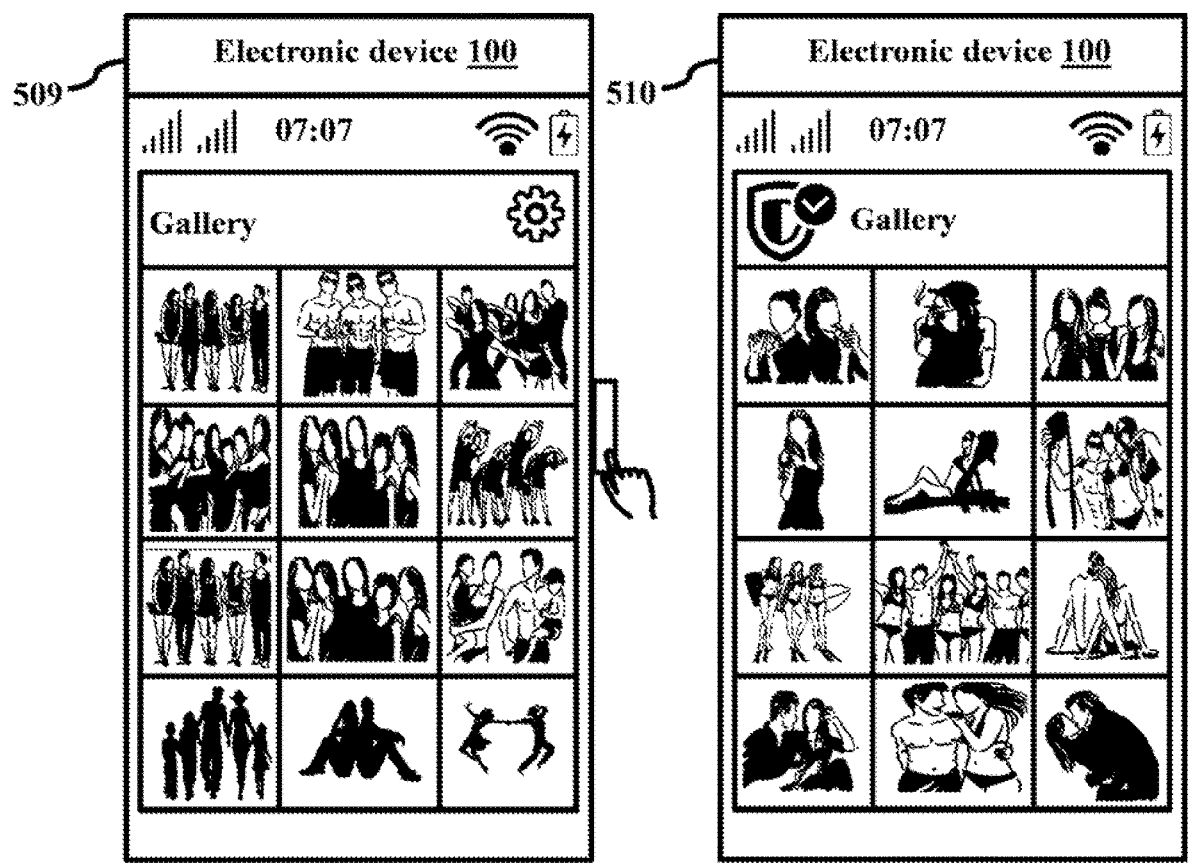

FIGS. 5A, 5B and 5C are diagrams illustrating an example scenario in which the electronic device (100) manages the private content by enabling a quick switch option to switch quickly between the non-secure folder of the electronic device (100) and the secure folder of the electronic device (100) based on the user preference for the private content and the public content, according to various embodiments.

At 501, the quick switch option may be enabled/disabled by the user of the electronic device (100) via a side key settings page and a quick switch settings page inside secure folder settings. In global settings, the quick switch is been disabled by default until a secure folder is configured. The user of the electronic device (100) will be requested to use the quick switch via notice after the secure folder has been created.

At 502, after the quick switch option is enabled, the user of the electronic device (100), by the application controller (150), can toggle between a public mode (non-secure folder) and a private mode (secure folder) by performing a gesture (e.g., pressing the power button twice) on the electronic device (100).

In an embodiment, if the user of the electronic device (100) is using 'A' application (150a) in the public mode and then utilizes the seamless switch, the 'A' application (150a) will launch in the private mode after requesting for authentication of the user of the electronic device (100). If a user is using the 'A' application (150a) in the private mode and utilizes the seamless switch, the 'A' application (150a) will be accessed in the public mode without requiring authentication of the user of the electronic device (100). When the user switches from the public mode to the private mode, just the toast message appears to let the user know that he or she is in the private mode. The private mode toast will not appear during key guard authentication since the user realizes that he or she is inputting the private mode. Toast will not appear when the user switches from the private mode to the public mode since it will be utilized in a handover situation (the user might do this to give the electronic device (100) to someone so that other user should not know switch happened).

In an embodiment, further, considering a resume state is maintained if the application was already opened in its respective mode. For example, if the 'A' application (150a) was already opened in the public mode in a 'B' state (inside 'A' application (150a)) and now the user uses seamless switch of the 'A' application (150a) from inside secure folder then the A' application (150a) will resume from its 'B' state in the public mode and vice-versa. The 'A' application (150a) fresh launch of the application (150a-150n) is only expected when the application (150a-150n) was not launched before or the application (150a-150n) was killed from the recent tab.

In an embodiment, when the application (150a-150n) is present in either of one mode (either the public mode or the private mode), if the user of the electronic device (100) performs a seamless switch while using 'A' application (150a) in the public mode, the private mode home page (the private mode home page is where all secure folder applications are shown) will open after the authentication of the user of the electronic device (100). If the user of the electronic device (100) utilizes the seamless transition while using 'A' application (150a) in the private mode (secure folder), the home page will appear in the public mode without prompting the authentication of the user of the electronic device (100).

In an embodiment, further, exception scenarios, if the electronic device (100) is locked and the user of the electronic device (100) tries the quick switch then it will open to the home page of the private mode. The only camera application is an exception to this rule but the switch will happen without the toast due to technical limitations. While the quick switch if any application (150a-150n) does not have basic android permissions then the quick switch may or may not work. Here sometimes the user of the electronic device (100) can land on the home page as the application (150a-150n) get closed. The quick switch is not supported when the user of the electronic device (100) is in the private mode key guard page. It will not work on chooser screens. For example—Share via cases will not be supported in the quick switch as it is technically difficult to understand the underlying application. Similar cases will not be supported example camera 'complete action using' page, some community members invite friends page, update notifications cases.

In an embodiment, further, there are several modes/scenarios/cases where seamless switching isn't possible. A toast will appear in such cases, reminding the user that the Quick switch is not supported. Android for work (AFW) Profile Owner (PO) mode, pop-up mode, ultra power saving mode, split-screen mode, and pinned application are examples of such instances. The quick switch is supported in the secure folder disable case. As in this case, only a secure folder icon is removed. All other functionality of the secure folder works the same so even the quick switch function will work similarly.

At 503, consider an example scenario in which the content controller (160) identifies the globally objectionable private content from the electronic device's (100) gallery application. At 504, the content controller (160) identifies user-specific objectionable private content for which the user of the electronic device (100) want to categorize the displayed content as the private content. At 505, the content controller (160) then automatically identifies the private content based on the globally objectionable private content and/or the user-specific objectionable private content. At 506, the content controller (160) then displays the recommendation on the screen (140) of the electronic device (100) for transferring the displayed content into the secure folder of the electronic device (100) in response to categorizing the displayed content as the private content.

At 507, the content controller (160) then detects the event (e.g., authentication) to transfer the private content into the secure folder of the electronic device (100). At 508, the content controller (160) then automatically transfers the private content from the non-secure folder to the secure folder of the electronic device (100) in response to detecting the event (i.e. authorized user can access the secure folder). At 509-510, the content controller (160) toggle between the private mode and the public mode as explained (502).

Figure 6:
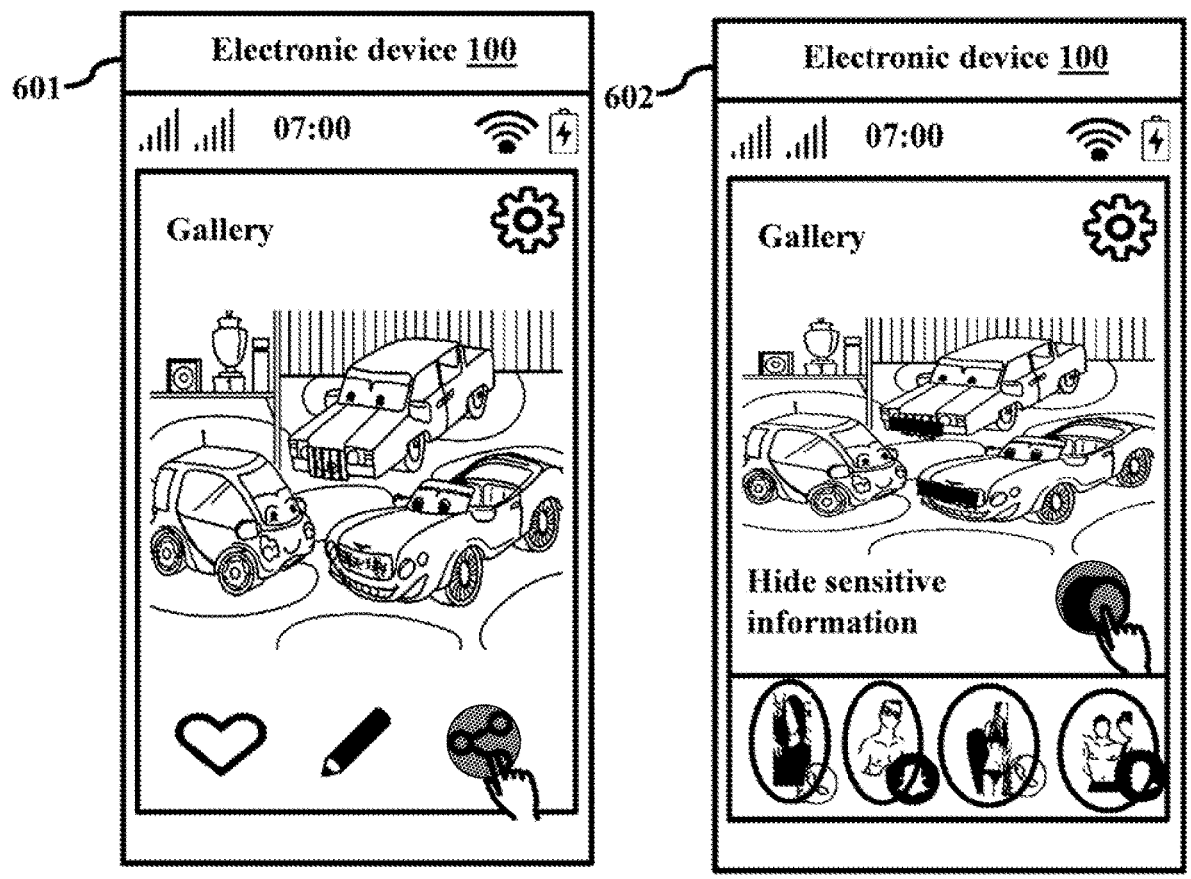
FIG. 6 is a diagram illustrating an example scenario in which the electronic device automatically recommends a suitable action(s) when the displayed content is detected as the private content, according to various embodiments.

FIG. 6 is a diagram illustrating an example scenario in which the electronic device (100) automatically recommends the suitable action(s) when the displayed content is detected as the private content, according to various embodiments.

When a user of an electronic device (100) wants to share the displayed content (e.g. an image of a car) with other users (at 601-602). When the displayed content is identified as private content, the content controller (160) automatically proposes the appropriate action(s) (e.g. encrypting, masking, etc.) before sharing with other users.

Figure 7:
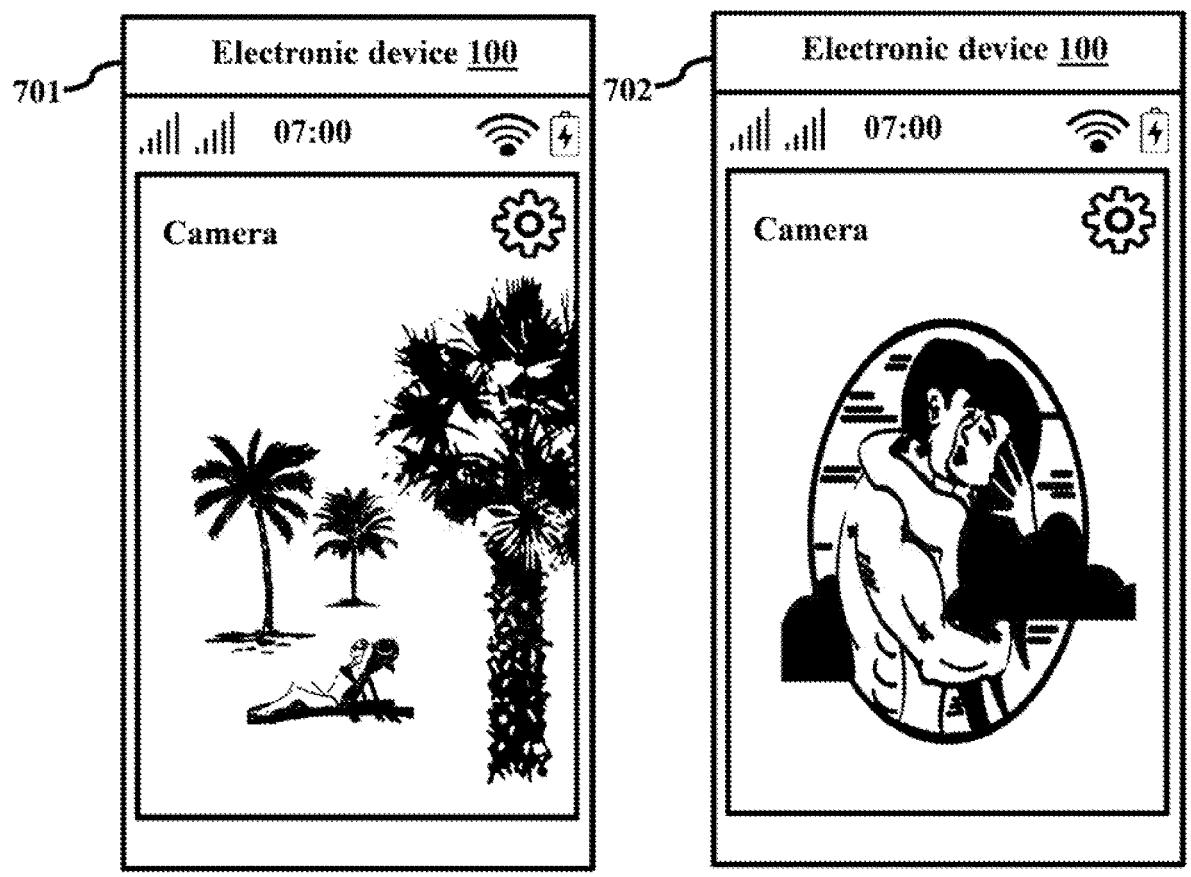
FIG. 7 is a diagram illustrating an example scenario in which the electronic device automatically recommends that the displayed content is detected as the private content for a far view concept and a occlude concept, according to various embodiments.

FIG. 7 is a diagram illustrating an example scenario in which the electronic device (100) automatically recommends that the displayed content is detected as the private content for a far view concept and a occlude concept, according to various embodiments.

Some existing methods/electronic device(s) for content classification or categorization/content detection fail to address circumstances such as a far view, group of content, occluded content (e.g. occluded private body part), and partially viewable content (e.g. partially viewable private body part).

Referring to 701, typically, when the content (e.g. human image) is shot in a far view scenario, the content under examination is extremely far from a camera position. As a result, a pixel percentage of the identification under examination is reduced. Existing deep learning ML models have the well-known problem of missing tiny items when identifying content or categorizing content. The proposed method/electronic device (100) is appropriate for instances where the content is tiny. The human blocks are detected using the person localizer (163). If there are several identified human blocks, human blocks are grouped based on the proximity threshold. The recognized human blocks (individual and groups) are sent into the sensitive image classifier (164), which detects the likelihood of profanity (high skin exposure).

Referring to 702, typically, when the content (e.g. human) is shot in an occluded private body part scenario or partially viewable private body part scenario, the content under examination is occlusion from the camera. As a result, existing deep learning ML models unable to identify content or categorizing content. The proposed method/electronic device (100) is appropriate for instances where the content is occluded private body part scenario or partially viewable private body part scenario. The private body part detector (162) detects private identifiers like belly, buttocks, female breasts, female genitalia, male genitalia, and male breasts, to identify content or categorizing content.

The embodiments disclosed herein can be implemented using at least one hardware device and performing network management functions to control the elements.

While the disclosure has been illustrated and described, with reference to various example embodiments, it will be understood that the various example embodiments are intended to be illustrative, not limiting. It will also be understood by those skilled in the art that one can readily modify and/or adapt for various embodiments without departing from the true spirit and full scope of the disclosure, including the appended claims and their equivalents. Therefore, such adaptations and modifications should and are intended to be comprehended within the scope of the disclosure. It is to be understood that the phraseology or terminology employed herein is for the purpose of description and not of limitation. Therefore, while the embodiments herein have been described in terms of example embodiments, those skilled in the art will recognize that the embodiments herein can be practiced with modification within the spirit and scope of the embodiments as described herein. It will also be understood that any of the embodiment(s) described herein may be used in conjunction with any other embodiment(s) described herein.

What is claimed is:

1. A method for managing private content by an electronic device, the method comprising:
    displaying, by the electronic device, content on a screen of the electronic device, wherein the content is stored in a non-secure folder of the electronic device;
    extracting, by the electronic device, at least one feature of the displayed content to categorize the displayed content using at least one Machine Learning (ML) model;
    detecting, by the electronic device, at least one of a globally objectionable private content and a user-specific objectionable private content;
    categorizing, by the electronic device, the displayed content into one of the private content and public content based on the at least one of the globally objectionable private content and the user-specific objectionable private content;
    displaying, by the electronic device, a recommendation on the screen of the electronic device for transferring the displayed content into a secure folder of the electronic device in response to categorizing the displayed content as the private content;
    detecting, by the electronic device, at least one event to transfer the private content into the secure folder of the electronic device; and
    automatically transferring, by the electronic device, the private content from the non-secure folder to the secure folder of the electronic device in response to detecting the at least one event,
    wherein categorizing, by the electronic device, the displayed content into the one of the private content and the public content based on the globally objectionable private content comprises:
    determining, by the electronic device, whether at least one of a private body part of a human is visible in the displayed content and an objectionable element is present in the displayed content;
    performing, by the electronic device, at least one of:
    categorizing the displayed content as the private content in response to determining that the at least one of the private body part of the human is visible in the displayed content and the objectionable element is present in the displayed content; and
    determining a cumulative confidence score to categorize the displayed content as the at least one of the private content and the public content in response to determining that the at least one of the private body part of the human is not visible in the displayed content and the objectionable element is not present in the displayed content,
    wherein determining the cumulative confidence score to categorize an image frame of the displayed content as the at least one of the private content and the public content comprises:
    detecting, by the electronic device, that at least one private body part of the human is not visible in the image frame;
    determining, by the electronic device, whether multiple human blocks are identified in the image frame; and
    performing, by the electronic device, at least one of:
    determining a first threshold value in response to determining that the multiple human blocks are identified in the image frame; and
    determining a second threshold value using a sensitive image classifier in response to determining that the multiple human blocks are not identified in the image frame;
    determining, by the electronic device, the cumulative confidence score by adding the first threshold value and the second threshold value,
    wherein determining the first threshold value comprises:
    detecting, by the electronic device, a block proximity threshold;
    determining, by the electronic device, whether the multiple human blocks meet the block proximity threshold;
    performing, by the electronic device, at least one of:
    grouping the multiple human blocks into a single block and passing the multiple human blocks to the sensitive image classifier to calculate the first threshold value in response to determining that the multiple human blocks meet the block proximity threshold; and
    passing individual blocks to the sensitive image classifier to calculate the first threshold value in response to determining that the multiple human blocks do not meet the block proximity threshold.

2. The method as claimed in claim 1, wherein the displayed content is categorized as the private content based on the cumulative confidence score being greater than or equal to a specified threshold value and the displayed content is categorized as the public content based on the cumulative confidence score being less than the specified threshold value.

3. The method as claimed in claim 1, wherein the private body part of the human comprises at least one of a belly of the human, buttocks of the human, breasts of the human, and genitalia of the human.

4. The method as claimed in claim 1, wherein the at least one objectionable element comprises at least one of a cigarette, a beer bottle, a wine bottle, a champagne bottle, a beer glass, a wine glass, a whiskey glass, a cocktail glass, biometric data of a user, medical information of the user, Personally Identifiable Financial Information (PIFI) of the user and unique identifiers of the user.

5. The method as claimed in claim 1, wherein categorizing, by the electronic device, the displayed content into the one of the private content and the public content based on the user-specific objectionable private content comprises:
   determining, by the electronic device, a user preference for the private content and the public content from a plurality of domains of the electronic device using a multi-modal joint embedding space;
   storing, by the electronic device, the user preference as at least one template in the electronic device; and
   correlating, by the electronic device, the at least one extracted feature with the at least one stored template to categorize the displayed content into the one of the private content and the public content.

6. The method as claimed in claim 1, wherein detecting, by the electronic device, the at least one event to transfer the private content into the secure folder of the electronic device comprises:
   detecting, by the electronic device, that the displayed content is the private content;
   receiving, by the electronic device, at least one input on the screen of the electronic device;
   determining, by the electronic device, whether the at least one input is authorized;
   performing, by the electronic device, at least one of:
   initiating transfer of the displayed content from the non-secure folder to the secure folder of the electronic device in response to determining that the at least one input is authorized; and
   not initiating transfer of the displayed content from the non-secure folder to the secure folder of the electronic device in response to determining that the at least one input is not authorized.

7. The method as claimed in claim 1, wherein the at least one event on the electronic device comprises at least one gesture of the user of the electronic device to shift the private content into the secure folder of the electronic device, and at least one gesture of the user of the electronic device to switch quickly between the non-secure folder of the electronic device and the secure folder of the electronic device.

8. The method as claimed in claim 7, wherein switching from the non-secure folder of the electronic device to the secure folder of the electronic device requires a user authentication, and switching from the secure folder of the electronic device to the non-secure folder of the electronic device does not require the user authentication.

9. The method as claimed in claim 1, wherein the method further comprises: automatically recommending at least one suitable action based on the displayed content being detected as the private content.

10. An electronic device configured to manage private content, the electronic device comprising:
   a memory;
   a processor comprising processing circuitry; and
   a content controller comprising circuitry, operably connected to the memory and the processor, configured to:
   control the electronic device to display content on a screen of the electronic device, wherein the content is stored in a non-secure folder of the electronic device;
   extract at least one feature of the displayed content to categorize the displayed content using at least one Machine Learning (ML) model;
   detect at least one of a globally objectionable private content and a user-specific objectionable private content;
   categorize the displayed content into one of the private content and public content based on the at least one of the globally objectionable private content and the user-specific objectionable private content;
   display a recommendation on the screen of the electronic device for transferring the displayed content into a secure folder of the electronic device in response to categorizing the displayed content as the private content;
   detect at least one event to transfer the private content into the secure folder of the electronic device; and
   automatically transfer the private content from the non-secure folder to the secure folder of the electronic device in response to detecting the at least one event,
   determine whether at least one of a private body part of a human is visible in the displayed content and an objectionable element is present in the displayed content;
   perform at least one of: (i) categorizing the displayed content as the private content in response to determining that the at least one of the private body part of the human is visible in the displayed content and the objectionable element is present in the displayed content; and (ii) determining a cumulative confidence score to categorize the displayed content as the at least one of the private content and the public content in response to determining that the at least one of the private body part of the human is not visible in the displayed content and the objectionable element is not present in the displayed content,
   detect that at least one private body part of the human is not visible in the image frame;
   determine whether multiple human blocks are identified in the image frame; and
   perform at least one of: (i) determining a first threshold value in response to determining that the multiple human blocks are identified in the image frame; and (ii) determining a second threshold value using a sensitive image classifier in response to determining that the multiple human blocks are not identified in the image frame;
   determine the cumulative confidence score by adding the first threshold value and the second threshold value,
   detect a block proximity threshold;
   determine whether the multiple human blocks meet the block proximity threshold;
   perform at least one of: (i) grouping the multiple human blocks into a single block and passing the multiple human blocks to the sensitive image classifier to calculate the first threshold value in response to determining that the multiple human blocks meet the block proximity threshold; and (ii) passing individual blocks to the sensitive image classifier to calculate the first threshold value in response to determining that the multiple human blocks do not meet the block proximity threshold.

\* \* \* \* \*